(12) United States Patent
Bruce et al.

(10) Patent No.: US 7,250,110 B2
(45) Date of Patent: Jul. 31, 2007

(54) ELECTRO-KINETIC WATER CONDITIONING

(76) Inventors: George C. Bruce, 131 S. Pershing, Wichita, KS (US) 67218; Thomas J. Martin, 132 S. Ridgewood, Wichita, KS (US) 67218

( * ) Notice: Subject to any disclaimer, the term of this patent is extended or adjusted under 35 U.S.C. 154(b) by 237 days.

(21) Appl. No.: 10/850,907

(22) Filed: May 24, 2004

(65) Prior Publication Data

US 2005/0258104 A1    Nov. 24, 2005

(51) Int. Cl.
*C02F 1/48* (2006.01)
(52) U.S. Cl. .................. 210/696; 205/743; 205/755; 210/748
(58) Field of Classification Search .............. 210/696
See application file for complete search history.

(56) References Cited

U.S. PATENT DOCUMENTS

| | | | | |
|---|---|---|---|---|
| 3,843,507 A | * | 10/1974 | Kwan ...................... 204/643 |
| 4,490,252 A | * | 12/1984 | Brigante ................... 210/222 |
| 5,204,006 A | * | 4/1993 | Santoli ...................... 210/696 |
| 5,230,807 A | * | 7/1993 | Kozlowski, II ............ 210/696 |
| 5,470,462 A | * | 11/1995 | Gauger .................... 210/198.1 |
| 5,575,974 A | * | 11/1996 | Wurzburger et al. ........ 204/232 |
| 5,681,457 A | * | 10/1997 | Mahoney ................. 210/198.1 |
| 5,695,644 A | * | 12/1997 | Buchanan et al. .......... 210/696 |
| 6,126,820 A | * | 10/2000 | DeSanto ................... 210/143 |
| 6,267,883 B1 | * | 7/2001 | Weaver et al. ........... 210/198.1 |
| 6,416,668 B1 | * | 7/2002 | Al-Samadi ................ 210/636 |

* cited by examiner

*Primary Examiner*—Peter A. Hruskoci
(74) *Attorney, Agent, or Firm*—Richard W. Hanes; January D. Barrett; Hanes & Schutz, LLC

(57) ABSTRACT

A method for treating hard water comprising the steps of flowing water containing suspended colloidal mineral particles through a confined treatment zone, applying an electrical potential across the flowing water to cause electrical current to flow through the water, increasing the zeta potential of the suspended colloidal particles. The increased zeta potential causes the particles to repel each other, preventing aggregation and precipitation onto surfaces in contact with the water to form scale or create hard pan conditions in soil on which the water falls.

3 Claims, 6 Drawing Sheets

US 7,250,110 B2

ELECTRO-KINETIC WATER CONDITIONING

BACKGROUND

Perceived hard water environments exist where water contains more than 5 grains of calcium carbonate ($CaCO_3$) per gallon. Such a condition forms undesirable scale in pipes, cooling towers, tubs, showers and sinks when colloidal $CaCO_3$ comes out of suspension in an electro statically un-stable hard water environment. Following evaporation of hard water used for irrigation, the walls and fences exposed to the spray of sprinklers are stained by the accumulation of the concentrated deposits of $CaCO_3$. In addition, the deposited $CaCO_3$ creates hardpan soil conditions that reduce the ability of the soil to absorb water and necessary minerals for plant utilization.

A common method of treating hard water to avoid these problems includes adding sodium chloride salt to the water. This method, commonly known as "softening", involves the replacement of the calcium ion in the compound a sodium ion, forming sodium carbonate that does not precipitate out of solution to form scale. While this softening method continues to see extensive use, it has several disadvantages. First, the process consumes salt and requires continuous maintenance and replenishment of this ingredient in the ongoing process. Secondly, the discharge from regeneration of the ingredient following such softening treatment has been known to have a negative effect upon subsequent water treatment operations. Third, such treatment of drinking water may be counter-productive and harmful to the health of the large number of people relegated to a low sodium diet.

Filtering of water has also been used as an adjunct to water softening but is usually a component of a more elaborate and expensive process, such as chlorination disclosed in U.S. Pat. No. 5,751,598.

Electro magnetic processes, such as disclosed in U.S. Pat. No. 4,288,323, have seen limited use in water softening applications. The disadvantage of such a method is that once the water leaves the influence of the applied magnetic field the purported beneficial effect of the treatment is short lived. The colloidal particles again become electrostatically unstable and tend to aggregate and form scale.

The method of the present invention overcomes the disadvantages of the prior art by providing an economical system of electrically treating hard water. In the process of the present invention the colloidal calcium carbonate particles are held in suspension, keeping them from aggregating to form scale in pipes, boilers, and plumbing fixtures or creating hard pan soil conditions.

Thus, it is the primary object of the present invention to provide a method for treating hard water that creates and maintains an electrostatically stable colloidal water environment that retards the formation of scale and hard pan soil conditions.

SUMMARY OF THE INVENTION

An electric current is passed through flowing hard water that contains colloidal minerals, particularly calcium carbonate. Electrons interact with the colloidal particles to increase their respective zeta potentials, producing a mutual repelling force between the particles in solution, preventing aggregation of the particles and resulting precipitation that forms scale, scum and hard pan soil conditions.

DESCRIPTION OF A PREFERRED EMBODIMENT

Figure 3:
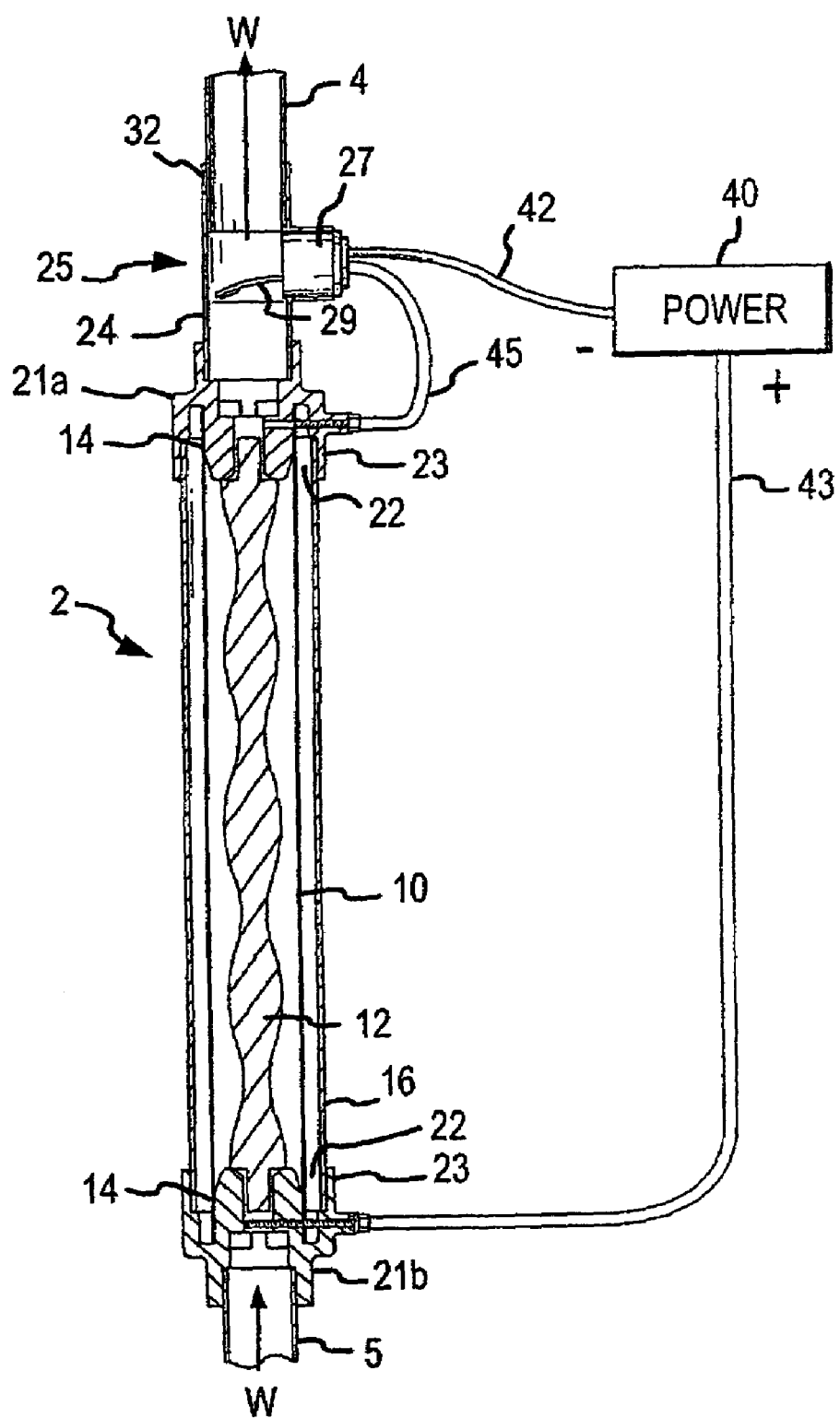
FIG. 3 is a longitudinal cross sectional view of the water conditioner of the present invention with electrical connections shown diagrammatically.

Hard water W containing suspended colloidal particles of calcium carbonate ($CaCO_3$) is directed into the water conditioner 2 of the present invention by means of a conduit or pipe 5. A cylindrical copper tube 10 forms the water-conducting conduit of the conditioner 2. Within the tube 10 and axially aligned with its central axis is an inner core 12. A housing 16 surrounds the copper tube 10. The tube 10 and the housing 16 are supported in a spaced apart relationship by end caps 21a and 21b, as best seen in FIG. 3.

At the input end of the conditioner 2 the reduced diameter portion of the end cap 21b is interconnected with the input pipe 5 that delivers hard water to the conditioner 2. The discharge end of the conditioner is fitted with a similar end cap 21a, also having a reduced diameter end. The reduced diameter end portion of the discharge end cap 21a receives one end 24 of a T-coupling 25 that houses an electrical switch 27. The switch is provided with a deflectable switch operating finger 29 that protrudes into the flow path of the water W that flows through the bar portion of the T-coupling 25 from the casing tube 10. The end 32 of the bar coupling 25 interconnects with an output pipe 4 that delivers water from the conditioner to the system.

Figure 1:
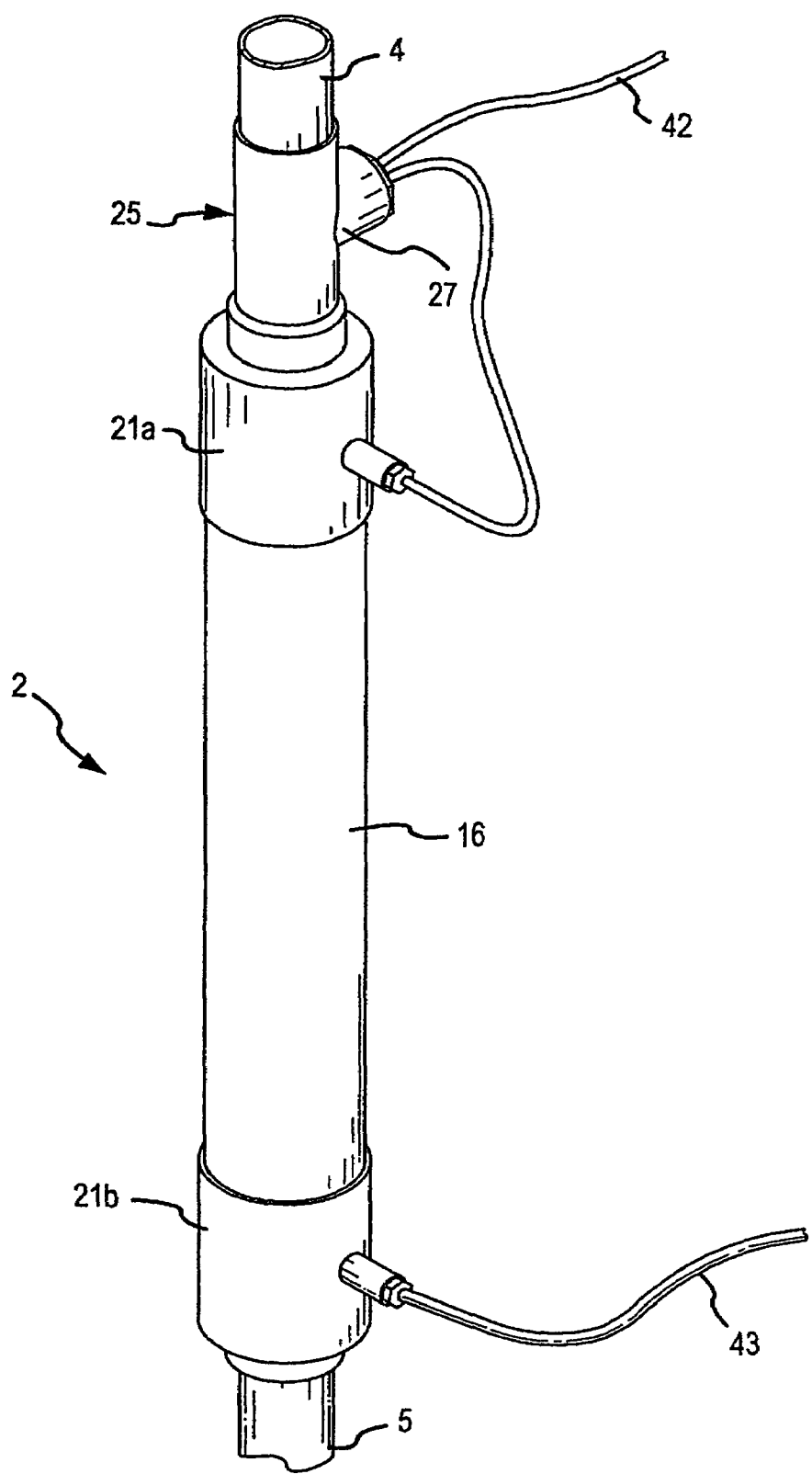
FIG. 1 is a perspective view of a preferred form of water conditioner of the present invention.
Figure 2:
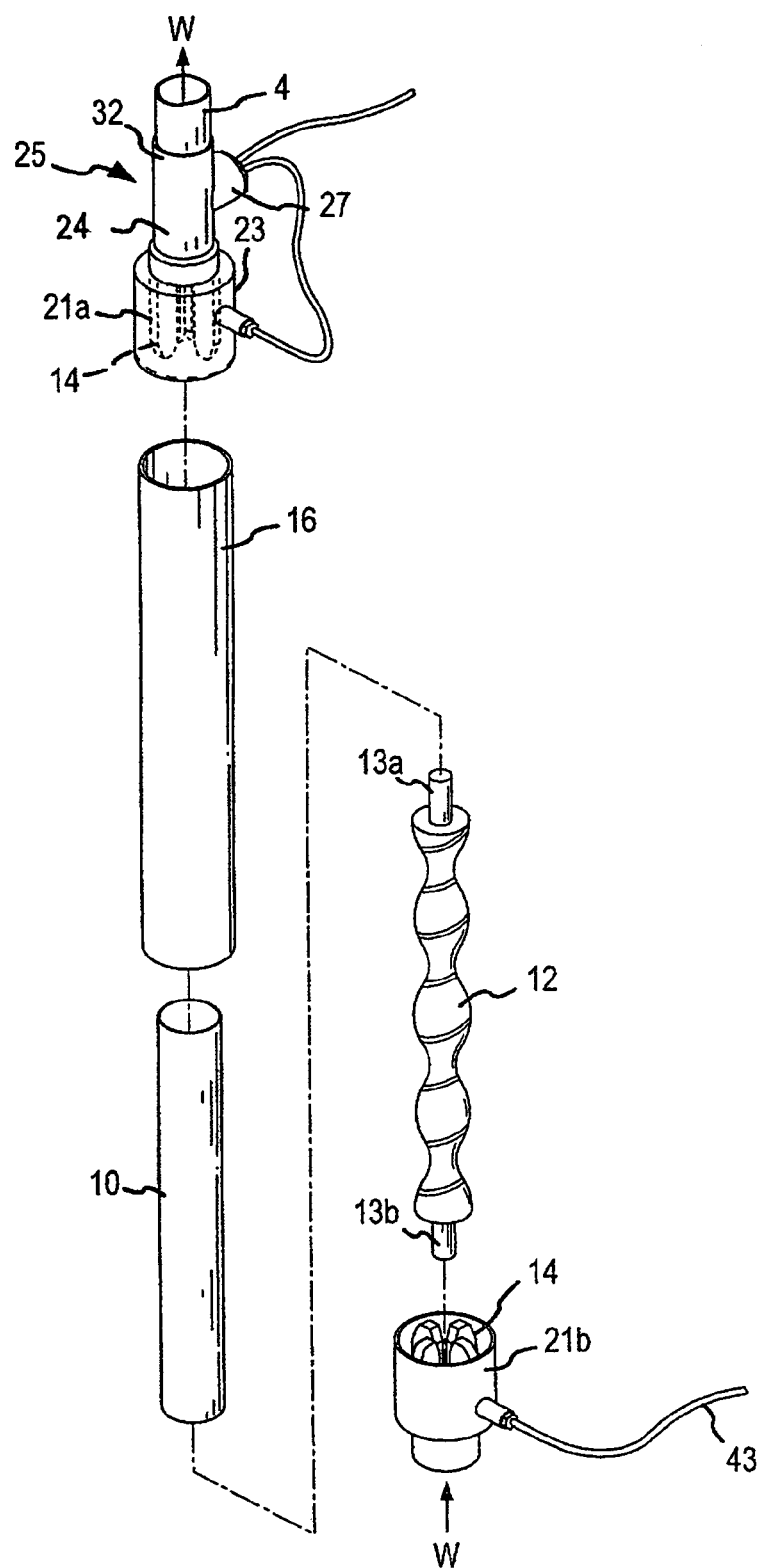
FIG. 2 is an exploded perspective view of the water conditioner.

The core 12 is supported within the tube 10 by a plurality of non-conductive blocks 14 radially disposed within each of the input and discharge end caps. As shown in FIGS. 2 and 3, the ends 13a and 13b of the core 12 are journaled in the axial space between the blocks 14 in each of the end caps 21a and 21b. As earlier stated, the end caps also support the tube 10 in a spaced apart relationship from the outer housing 16. Such support is best seen in FIG. 3 where the end portion of the housing 16 is inserted into the annular cavity 22 and against the inside surface of the outside wall 23 of the respective end caps 21a and 21b. Each end portion of the tube 10 is disposed in the cavity 22 of the respective end caps 21a and 21b so that the inside surface of the tube end bears against the circumferential outside edges of the radially placed blocks 14 that are carried by the end caps.

Exteriorly disposed of the conditioner 2 is a voltage source 40 of direct current (DC) electrical power. In small conditioner units applicable to residential applications, a voltage source of 12 volts is adequate and preferred. In larger water capacity units, increased voltage may be required. The negative side of the power source 40 is connected to one terminal of the flow responsive switch 27 by a conductor 42. The other switch terminal is interconnected by cable 45 to the copper tube 10 within the sleeve 16 of the conditioner. The positive side of the power source 40 is connected to the inner core 12 through a cable 43. When the flow operated switch 27 is closed by the pressure of flowing water W against the switch trigger 29 the power source voltage appears across the inner core 12 and the copper casing tube 10. Resulting electrical current passes from the positively charged core 12 through the flowing water to the negative casing tube 10. In the event the flow of water W stops, the pressure on the switch trigger 29 disappears, the switch 27 opens and the current flow between the inner core 12 and the casing tube 10 ceases. If the current were allowed to flow while water was stagnant within the tube 10, electrolysis would take place, producing undesirable results.

Several aspects of the physical structure, if made in accordance with the preferred embodiment, can enhance the results of the basic process that takes place within the apparatus of the present invention. First, it is desirable to have the core 12 made of material that is a good electrical conductor. A copper/zinc alloy has such a characteristic and more specifically, the alloy C87300 is the preferred material for the core 12.

If the flow of water W through the conditioner 2 is made turbulent a greater number of colloidal particles will come under the influence of the electrical current flowing through the water. Thus, more of the particles are subjected to the increased electrical charge (zeta potential) that keeps them separated and in suspension. Contouring the shape of the core 12 or making its surface irregular creates the desired turbulence. Note that the contour of the exterior of the core 12 shown in the drawings has a sinusoidal shape to effect swirling turbulence in the flowing water. The shape of the core 12 shown in the drawings is exemplary only. Other surface shapes and/or irregular surfaces may be employed to produce the desired turbulence in the flowing water W.

The proportions shown in the drawings for the preferred embodiment are ideally suited for conditioning hard water delivered to a residence or small commercial facility. However, larger apparatus can be constructed for use where greater quantities of water must be conditioned as, for example, in industrial applications. Golf course irrigation water treatment to prevent the formation of undesirable hard pan in the soil is another example of a conditioner requiring greater capacity.

While specific apparatus is necessary to practice the present invention, many different configurations of structure may be employed to perform the method. Basically, the process for treating hard water contemplated by the present invention comprises only a few steps. First, flowing water containing suspended colloidal particles of minerals, particularly calcium carbonate, is passed through a confined treatment zone. In the preferred embodiment the treatment zone is the interior of the casing tube 10. Second, when the flowing water closes the switch 27, or when the system otherwise senses the movement of water through the devise, the electrical terminals in contact with the flowing water, tube 10 and core 12, are charged with an electrical potential sufficient to pass an electrical current through the flowing water. The current acts to increase the zeta potential of the colloidal mineral particles suspended in the water.

When the zeta potential of the particles reaches a certain level the suspended mineral particles electrostatically repel one another. The mutual repelling forces prevent the particles from aggregating. When the colloidal particles cannot aggregate the precipitate that otherwise gathers on surfaces that come into contact with the water to form scum and scale is eliminated or significantly reduced. Furthermore, without precipitation of the minerals there is no contribution by irrigating water to the formation of hard pan soil conditions.

An additional, but optional step in the treatment process is that of creating turbulence in the water flowing through the treatment zone in order to enhance the elevation of the zeta potential on the suspended mineral particles.

The basic purpose of the process is to control the colloidal behavior of the particles in suspension. More specifically the goal is to maximize the repulsive force between the particles in order to keep each particle discrete and to prevent the particles in suspension from gathering into larger, faster settling agglomerates. To further understand the process, a passing acquaintance with the concept of zeta potential is necessary.

Understanding the surface forces that are at work at the interface of a colloidal particle and its surrounding suspending liquid is an important first step. One of the major surface effects is electro-kinetic. Each colloid carries a "like" electrical charge that produces a force of mutual electrostatic repulsion between adjacent particles. If the charge is high enough, the colloids will remain discrete, disperse and in suspension. Particle charge can be controlled by modifying the suspending liquid, including changing the pH of the liquid, or changing the ionic species in solution. The later modification is the one used in the process of the present invention.

Figure 4:
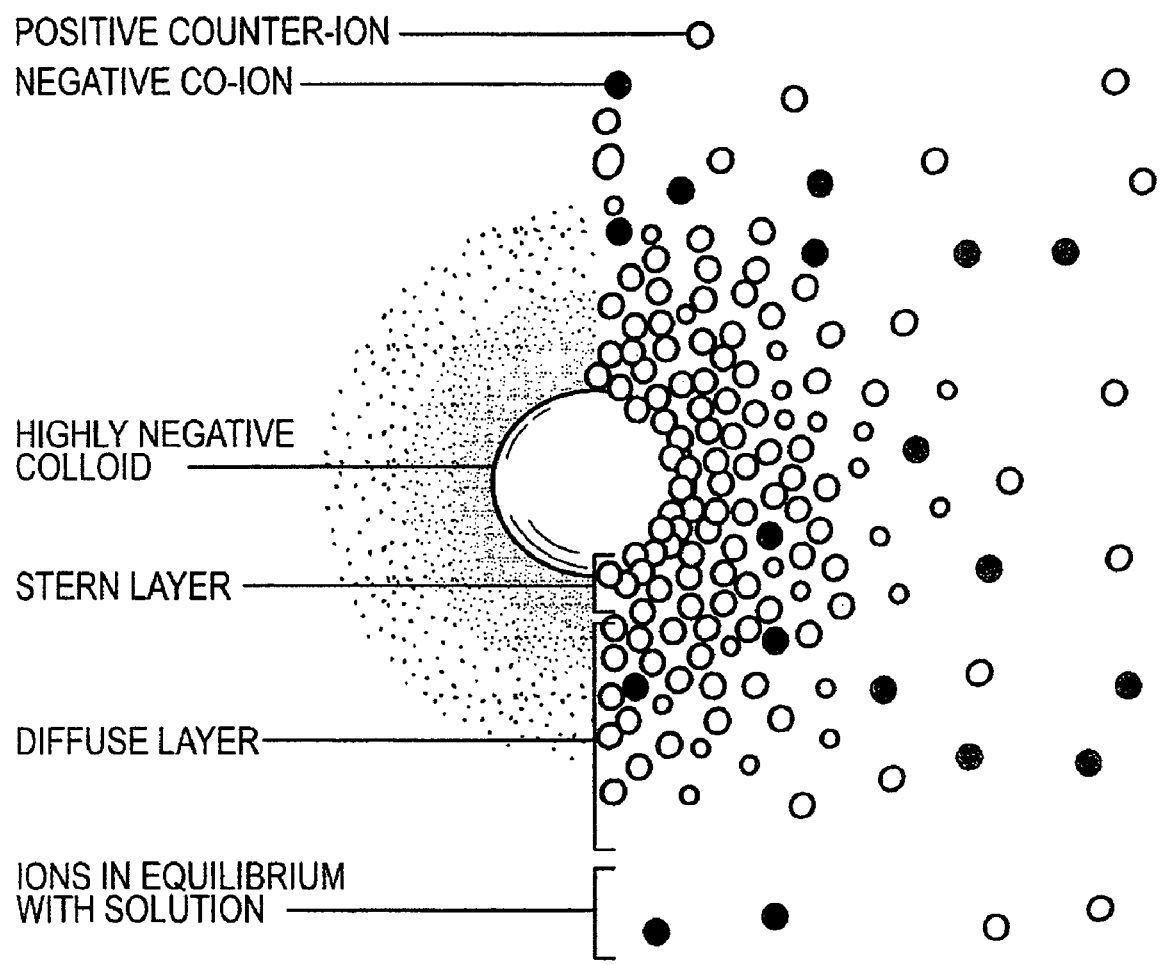
FIG. 4 is a divided diagrammatic view showing on its left side a macro view of the electrostatic charge density around a colloidal particle suspended in water while showing on the right side an enlarged micro version of the distribution of positive and negative ions around a charged colloidal particle.

The double-sided model of FIG. 4 is useful in visualizing the ionic environment in the vicinity of a charged colloid and illustrates how repulsive forces occur. Initially, attraction from the negative colloid causes some of the positive ions (counter-ions) to form a firmly attached layer around the surface of the colloid. This layer of counter-ions is known as the Stern layer. Additional positive ions are still attracted by the negative colloid, but they are repelled by the Stern layer as well as by other positive ions that are also trying to approach the colloid. This dynamic equilibrium results in the formation of a diffuse layer of counter-ions. The high concentration of counter-ions near the surface of the colloid is gradually reduced as distance from the colloid increases until a point of equilibrium is reached with the counter-ion concentration in the solution.

Figure 5A:
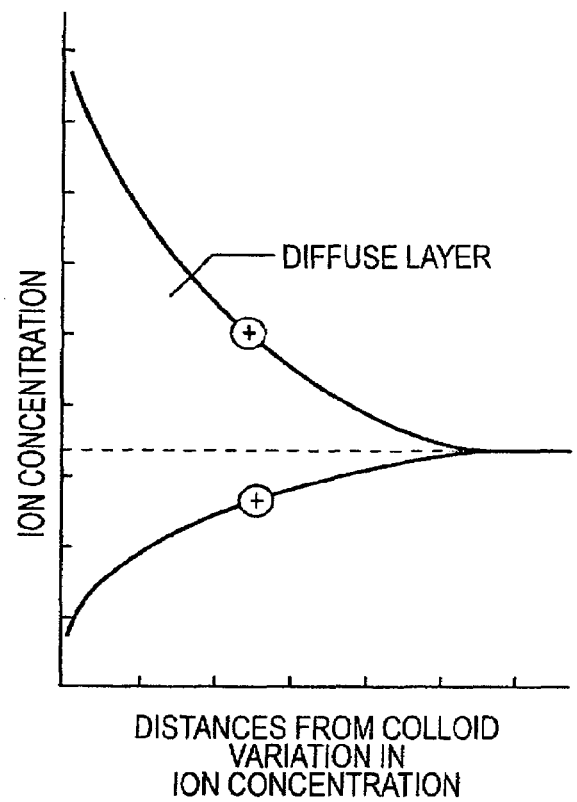
FIG. 5a is a graph depicting the relationship between ion concentration and distance from the colloidal particle.

In a similar, but opposite, fashion negative ions in the neighborhood of the surface are repelled by the negative colloid. Negative ions are called co-ions because they have the same charge as the colloid. As shown in FIG. 5a, their concentration will gradually increase with distance from the colloid, as the repulsive forces of the colloid are screened out by the positive ions, until equilibrium is again reached.

Figure 5B:
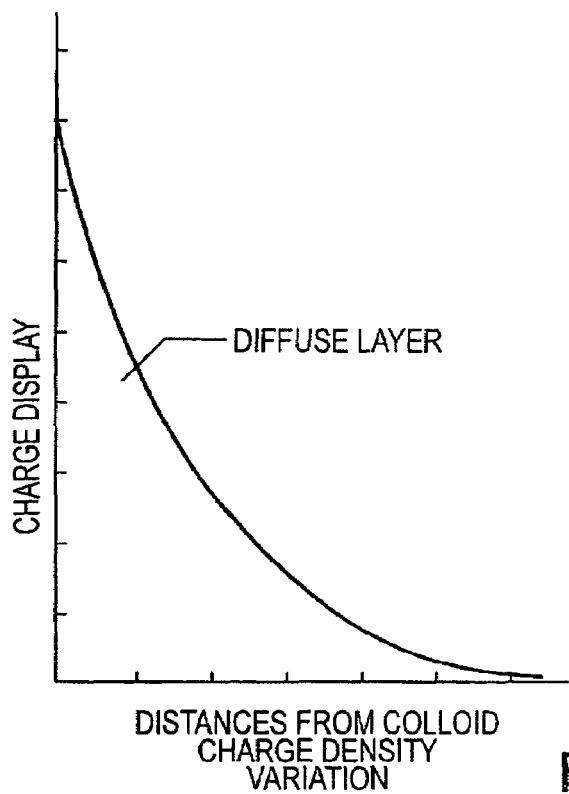
FIG. 5b is a graph depicting the relationship between charge density and distance from the colloidal particle.

The diffuse layer can be visualized as a charged atmosphere surrounding the colloid. The charge density at any distance from the surface is equal to the difference in concentration of positive and negative ions at that point. As shown in FIG. 5b, the charge density is greatest near the colloid and gradually diminishes toward zero as the concentration of positive and negative ions merge.

The attached counter-ions in the Stern layer and the charged atmosphere in the diffuse layer are referred to as the double layer. The thickness of this layer depends upon the type and concentration of ions in solution. The double layer is formed in order to neutralize the charged colloid and, in turn, causes an electro-kinetic potential between the surface of the colloid and any point in the mass of the suspending liquid. This voltage difference is on the order of millivolts and is referred to as the surface potential.

Figure 5C:
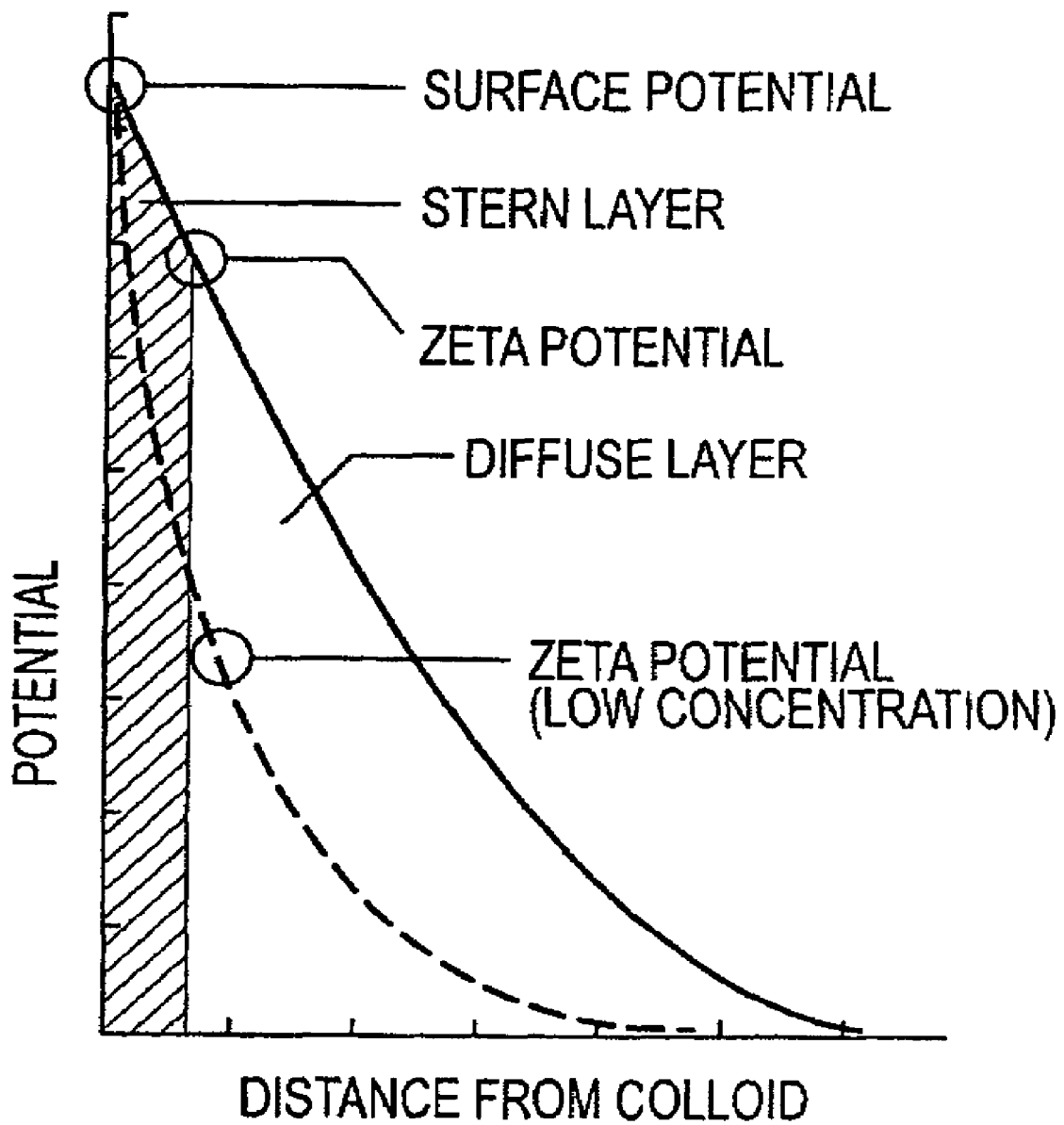
FIG. 5c is a graph depicting the relationship between potential and distance from the colloidal particle.

The magnitude of the surface potential is related to the surface charge and the thickness of the double layer. As distance from the surface increases, the potential drops off roughly linearly in the Stern layer and then exponentially through the diffuse layer, approaching zero at the imaginary boundary of the double layer, as shown in the graph of FIG. 5c. This electrostatic potential curve is useful because it indicates the strength of the electrical force between particles and the distance at which this force comes into play.

A charged particle will move with a fixed velocity in a voltage field. This phenomenon is called electrophoresis. The particle's mobility is related to the dielectric constant and viscosity of the suspending liquid and to the electrical potential at the boundary between the moving particle and the liquid. This boundary is called the slip plane and is usually defined as the point where the Stern layer and the diffuse layer meet. The Stern layer is considered to be rigidly attached to the colloid, while the diffuse layer is not. As a result, the electrical potential at this junction is related to the mobility of the particle and is called the zeta potential. The voltage potential across the flowing water W produced by the power source 40 and the associated terminals 12 and 10 create higher particle mobility within the water and increase the zeta potential of the suspended particles.

Although zeta potential is an intermediate value, it is sometimes considered to be more significant than surface potential as far as electrostatic repulsion is concerned. In the process of the present invention the zeta potential is increased between the suspended mineral particles in the water creating a condition where the water can hold more particles in solution without them precipitating out of solution and forming scale and scum on adjacent surfaces or hard pan soil conditions.

On a practical level, it has been found that the voltage potential measured between two spaced apart points in a body of untreated water will be on the order of +/−30 millivolts. Conversely, the same measurement made on water that has been conditioned by the process of the present invention will indicate a potential difference of upwards of +/−60 millivolts or higher. This significant difference is sufficient to maintain dissolved solids in suspension so they will not aggregate and precipitate out of solution.

What is claimed is:

1. A method for treating hard water comprising the steps of:

flowing water containing suspended colloidal mineral particles through a confined treatment zone including an inner core, a casing tube, and a housing surrounding said casing tube, said inner core having a shape to create turbulence in the flowing water within the treatment zone, and applying a voltage potential using a voltage source of direct current (DC) electrical power across the flowing water in the treatment zone to produce a flow of electrons therethrough from said inner core to said casing tube, that increases the zeta potential of the colloidal particles and a resulting condition where the colloidal mineral particles repel each other and do not aggregate and precipitate onto surfaces in contact with the water.

2. The method of claim 1 and further including the step of, terminating the flow of electrons through the water on the condition that the water stops flowing in the treatment zone.

3. A method for treating hard water comprising the steps of:

flowing water containing suspended colloidal mineral particles of through a confined treatment zone including an inner core, a casing tube, and a housing surrounding said casing tube, said inner core having a shape to create turbulence in the flowing water within the treatment zone, and increasing the zeta potential on the suspended colloidal particles in the water in the treatment zone using a voltage source of direct current (DC) electrical power to produce a flow of electrons therethrough from said inner core to said casing tube, and cause the particles to repel one another and keep them in solution to prevent their precipitation and formation of scale.

* * * * *